US010305698B2

(12) United States Patent
Stoufer

(10) Patent No.: US 10,305,698 B2
(45) Date of Patent: May 28, 2019

(54) SYSTEM, METHOD, APPARATUS, AND COMPUTER PROGRAM PRODUCT FOR CUSTOMIZING AN APPLIANCE DISPLAY

(71) Applicant: Electrolux Home Products, Inc., Charlotte, NC (US)

(72) Inventor: Paul Stoufer, Charlotte, NC (US)

(73) Assignee: ELECTROLUX HOME PRODUCTS, INC., Charlotte, NC (US)

(*) Notice: Subject to any disclaimer, the term of this patent is extended or adjusted under 35 U.S.C. 154(b) by 975 days.

(21) Appl. No.: 14/134,168

(22) Filed: Dec. 19, 2013

(65) Prior Publication Data
US 2015/0177969 A1 Jun. 25, 2015

(51) Int. Cl.
| | | |
|---|---|---|
| H04L 12/28 | (2006.01) | |
| H04L 29/08 | (2006.01) | |
| G06F 3/0484 | (2013.01) | |

(52) U.S. Cl.
CPC ...... *H04L 12/2807* (2013.01); *G06F 3/04842* (2013.01); *G06F 3/04847* (2013.01); *H04L 67/02* (2013.01); *H04L 2012/285* (2013.01)

(58) Field of Classification Search
CPC ... G06F 3/04847; G06F 3/04842; H04L 67/02
See application file for complete search history.

(56) References Cited

U.S. PATENT DOCUMENTS

| | | |
|---|---|---|
| 6,393,848 B2 | 5/2002 | Roh et al. |
| 6,682,161 B2 | 1/2004 | Yun |
| 6,809,295 B1 | 10/2004 | Vargas |
| 6,853,399 B1 | 2/2005 | Gilman et al. |
| 6,934,592 B2 | 8/2005 | Hood et al. |
| 7,090,141 B2 | 8/2006 | Roh et al. |
| 7,126,569 B2 | 10/2006 | Ootsuka et al. |

(Continued)

FOREIGN PATENT DOCUMENTS

FR 2 826 813 A1 12/2002

OTHER PUBLICATIONS

International Search Report and Written Opinion of the International Searching Authority for corresponding International Application No. PCT/US2014/070528 dated Mar. 4, 2015.

(Continued)

*Primary Examiner* — Justin R. Blaufeld
(74) *Attorney, Agent, or Firm* — Womble Bond Dickinson (US) LLP

(57) ABSTRACT

A system, method, apparatus, and computer program product for customizing an appliance display are disclosed. A method may include receiving an indication of a selected image and an indication of a target appliance on which the selected image is to be displayed. The method may additionally include determining one or more display characteristics of a display of the target appliance. The method may also include processing the selected image based on the one or more display characteristics to generate a customized image formatted for display as a background image on the display of the target appliance. The method may further include configuring the target appliance, via a network, to display the customized image as a background image underlying a graphical user interface that may be displayed on the display during operation of the target appliance.

17 Claims, 9 Drawing Sheets

(56) References Cited

U.S. PATENT DOCUMENTS

| | | |
|---|---|---|
| 7,136,940 B2 | 11/2006 | Roh et al. |
| 7,143,599 B2 | 12/2006 | Wo |
| 7,155,923 B2 | 1/2007 | Nam et al. |
| 7,262,810 B2 | 8/2007 | Roh et al. |
| 7,639,485 B2 | 12/2009 | McCoy |
| 7,640,757 B2 | 1/2010 | Lee |
| 7,658,806 B2 | 2/2010 | Jeong et al. |
| 7,852,619 B2 | 12/2010 | McCoy |
| 2002/0088002 A1 | 7/2002 | Shintani et al. |
| 2003/0095156 A1 | 5/2003 | Klein et al. |
| 2006/0144056 A1 | 7/2006 | Oh |
| 2007/0200870 A1 | 8/2007 | Jeong et al. |
| 2008/0158385 A1* | 7/2008 | Lee .................... G06F 3/04845 348/231.3 |
| 2008/0178633 A1 | 7/2008 | Jeong et al. |
| 2008/0295033 A1* | 11/2008 | Lee ...................... F25D 23/126 715/840 |
| 2009/0007346 A1 | 1/2009 | Ha et al. |
| 2009/0016005 A1 | 1/2009 | McCoy |
| 2009/0019055 A1 | 1/2009 | White |
| 2009/0171970 A1* | 7/2009 | Keefe .................... G06Q 10/10 |
| 2010/0228751 A1 | 9/2010 | Oh et al. |
| 2012/0260683 A1 | 10/2012 | Cheon et al. |
| 2012/0287034 A1* | 11/2012 | Park .................... H04L 12/2807 345/156 |

OTHER PUBLICATIONS

Extended European Search Report dated Jul. 7, 2017 in European Patent Application No. 14873035.1.

* cited by examiner

SYSTEM, METHOD, APPARATUS, AND COMPUTER PROGRAM PRODUCT FOR CUSTOMIZING AN APPLIANCE DISPLAY

FIELD OF THE DISCLOSURE

Aspects of the disclosure relate to appliance interface technology and, more particularly, to a system, method, apparatus, and computer program product for customizing an appliance display.

BACKGROUND

In recent years, there has been rapid advancement in display technology. For example, advancements in technologies such as liquid crystal display (LCD) technology, organic light emitting diode (OLED) display technology, and other similar technologies have resulted in the development of display panels that are often capable of displaying full color, high resolution graphics. Moreover, the slim depth profile and continued reduction in cost of these displays have resulted in the integration of displays into a variety of consumer products that heretofore lacked such displays. For example, household appliances, such as refrigerators, washing machines, and the like, now often include flat panel displays that are used to display a graphical user interface that may be used to display appliance operating status information and, in the cause of touch screen displays, to control appliance operation.

Concurrent with the evolution in display technology, there has been an ongoing development in low cost home networking solutions as well as increasing consumer sophistication in deploying and maintaining home local area networks, such as wireless local area networks (WLANs). As a result, home local area networks are now ubiquitous and an increasing number of consumer products now offer networking capability supporting connectivity to a home local area network, as progress continues to be made toward the conceptual "connected home" in which a multitude of consumer devices within a home are interconnected via a network for purposes of information sharing and automation among multiple devices in a home. For example, many household appliances now offer network connectivity supporting connectivity to a home local area network as well as communication with devices outside the home local area network via the Internet.

SUMMARY

A system, method, apparatus, and computer program product for customizing an appliance display are disclosed. More particularly, some example embodiments provide for processing an image to generate a customized image formatted for display as a background image on a display of an appliance. In this regard, as appliance displays may have varying display characteristics, such as display size, supported resolution, color capabilities, and/or other display characteristics, the properties of an image formatted for one appliance display may differ from an image formatted for a second appliance display. Accordingly, such example embodiments may take an image selected by a user, such as an appliance owner, and process the image to generate a customized image formatted for display as a background image on a display of a selected appliance. Further, some example embodiments provide for configuration of a selected network connected appliance via a network to display the customized image as a background image on a display of the appliance. Accordingly, a selected image, such as a family photograph, scenic image, and/or other desired image, may be customized and displayed underlying a graphical user interface that may be displayed on an appliance. As such, appliance owners may be enabled to readily customize appliances to their preferences to display desired images, thus providing a sense of personalization for appliances.

In a first example embodiment, a method is provided, which may include receiving an indication of a selected image and an indication of a target appliance on which the selected image is to be displayed. The method may additionally include determining one or more display characteristics of a display of the target appliance. The method may further include processing the selected image based at least in part on the one or more display characteristics to generate a customized image formatted for display as a background image on the display of the target appliance. The method may also include configuring the target appliance, via a network, to display the customized image as a background image underlying a graphical user interface displayed on the display during operation of the target appliance.

In a second example embodiment, an apparatus is provided, which may include processing circuitry. The processing circuitry may be configured to cause the apparatus to receive an indication of a selected image and an indication of a target appliance on which the selected image is to be displayed. The processing circuitry may be further configured to cause the apparatus to determine one or more display characteristics of a display of the target appliance. The processing circuitry may additionally be configured to cause the apparatus to process the selected image based at least in part on the one or more display characteristics to generate a customized image formatted for display as a background image on the display of the target appliance. The processing circuitry may also be configured to cause the apparatus to configure the target appliance, via a network, to display the customized image as a background image underlying a graphical user interface displayed on the display during operation of the target appliance.

In a third example embodiment, a computer program product is provided, which may include at least one non-transitory computer-readable storage medium having program instructions stored thereon. When executed by at least one processor, the stored program instructions may cause the at least one processor to perform a method comprising receiving an indication of a selected image and an indication of a target appliance on which the selected image is to be displayed; determining one or more display characteristics of a display of the target appliance; processing the selected image based at least in part on the one or more display characteristics to generate a customized image formatted for display as a background image on the display of the target appliance; and configuring the target appliance, via a network, to display the customized image as a background image underlying a graphical user interface displayed on the display during operation of the target appliance.

In a fourth example embodiment, an apparatus is provided, which may include means for receiving an indication of a selected image and an indication of a target appliance on which the selected image is to be displayed. The apparatus may additionally include means for determining one or more display characteristics of a display of the target appliance. The apparatus may further include means for processing the selected image based at least in part on the one or more display characteristics to generate a customized image formatted for display as a background image on the display of the target appliance. The apparatus may also include means for configuring the target appliance, via a network, to display the customized image as a background image underlying a graphical user interface displayed on the display during operation of the target appliance.

In a fifth example embodiment, a system is provided, which may include one or more servers, a network connected appliance, and a user terminal. The network connected appliance may include a display configured to display a graphical user interface during operation of the network connected appliance. The user terminal may be configured to send an indication of a selected image to the one or more servers. The one or more servers may be configured to receive the indication of the selected image; determine one or more display characteristics of the display; process the selected image based at least in part on the one or more display characteristics to generate a customized image formatted for display as a background image on the display; and configure the network connected appliance to display the customized image on the display as a background image underlying the graphical user interface.

It will be appreciated that the above Summary is provided merely for purposes of summarizing some example embodiments so as to provide a basic understanding of some aspects of the disclosure. As such, it will be appreciated that the above described example embodiments are merely examples of some embodiments and should not be construed to narrow the scope or spirit of the disclosure in any way. It will be appreciated that the scope of the disclosure encompasses many potential embodiments, some of which will be further described below, in addition to those here summarized. Further, other aspects and advantages of embodiments disclosed herein will become apparent from the following detailed description taken in conjunction with the accompanying drawings which illustrate, by way of example, the principles of the described embodiments.

BRIEF DESCRIPTION OF THE DRAWINGS

Figure 1:
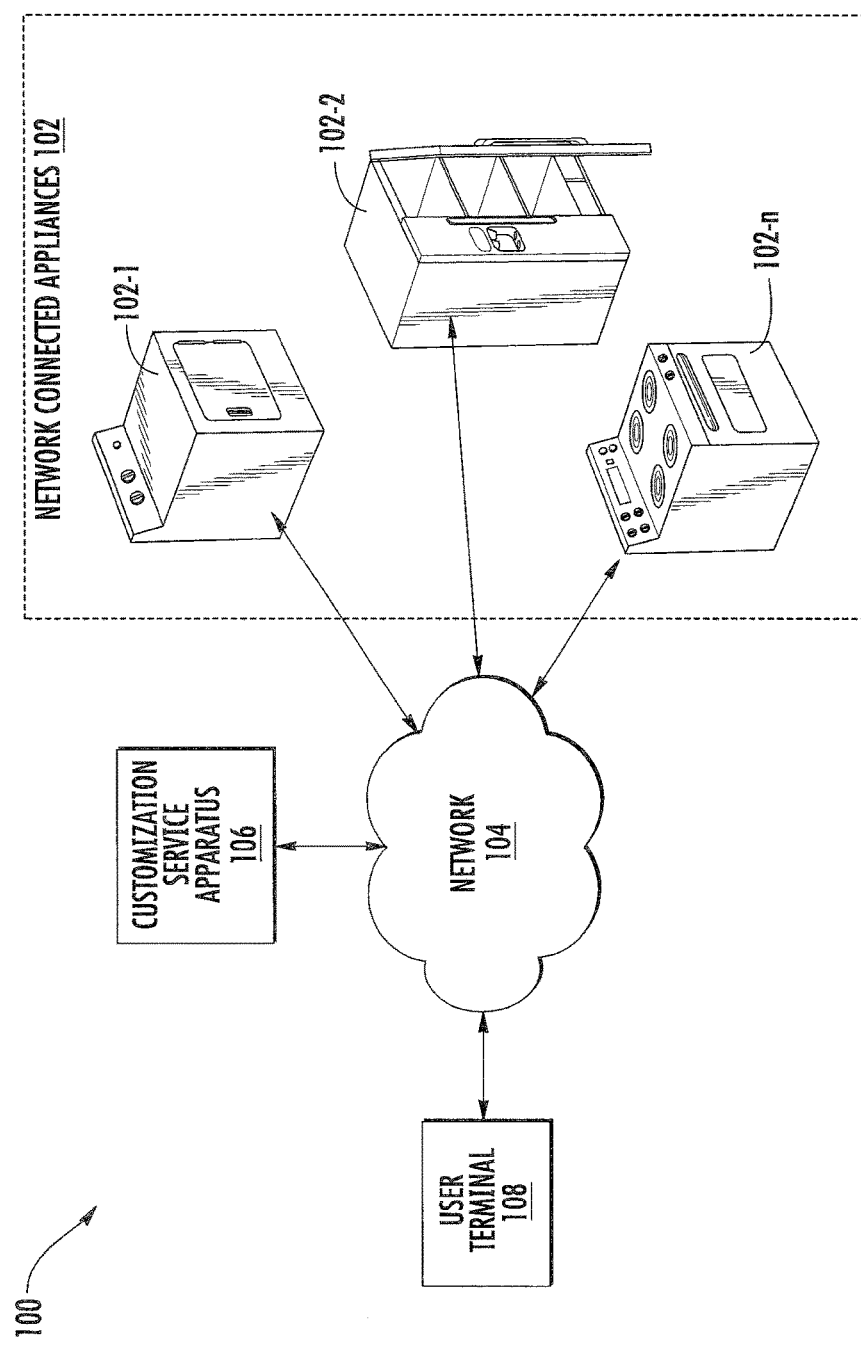
Figure 2:
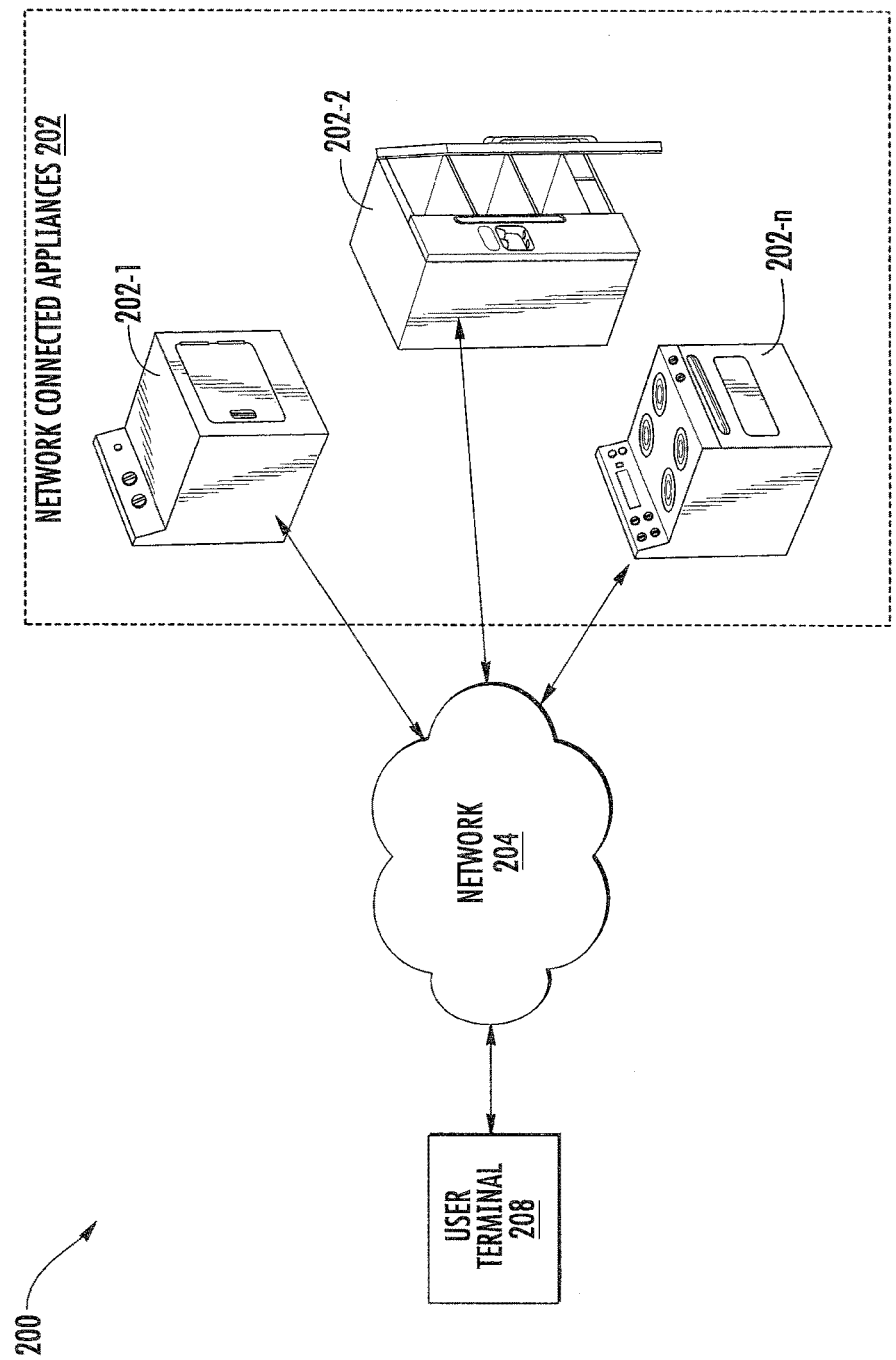
Figure 3:
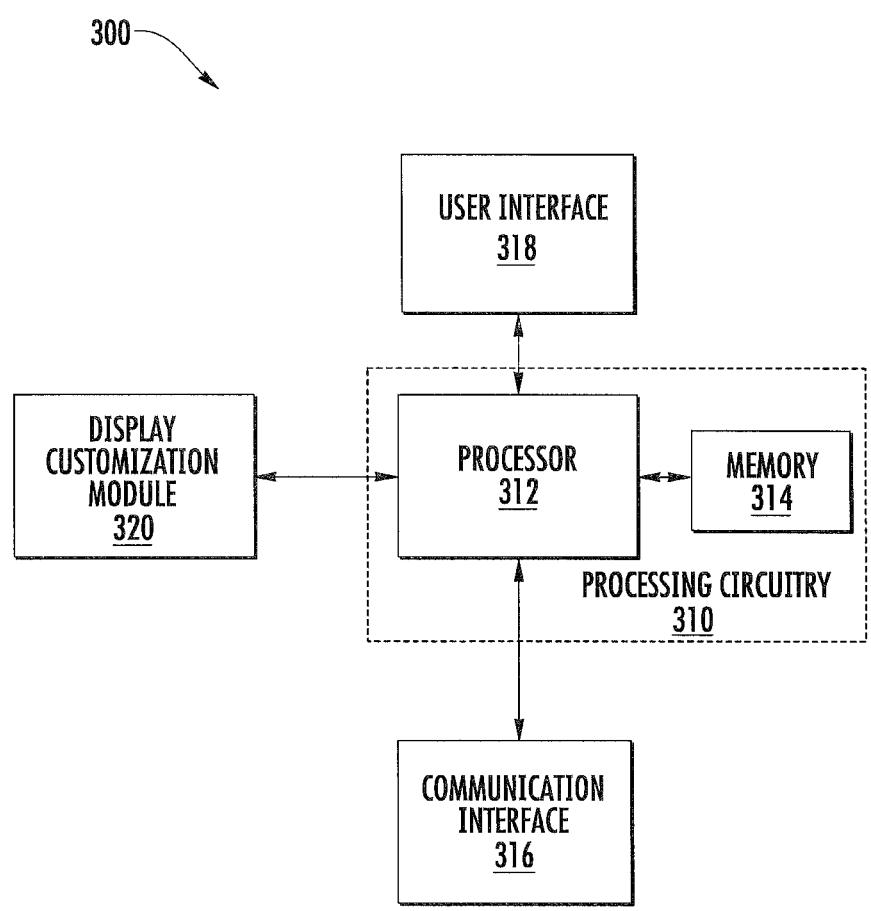
Figure 4:
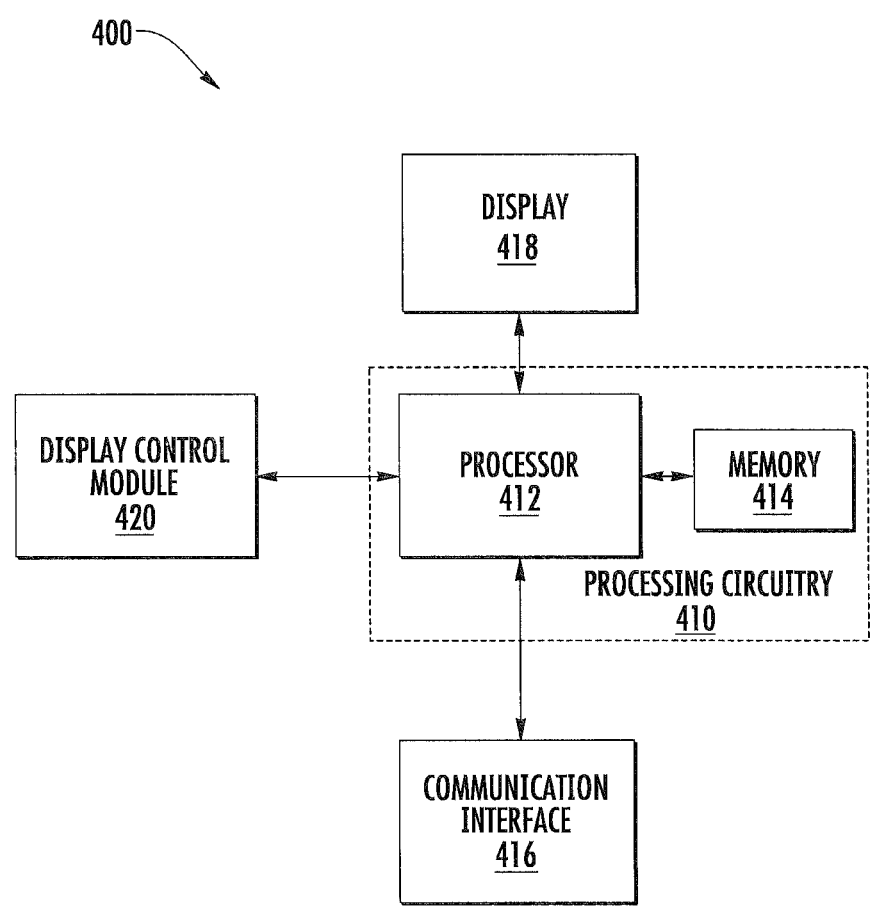
Figure 5:
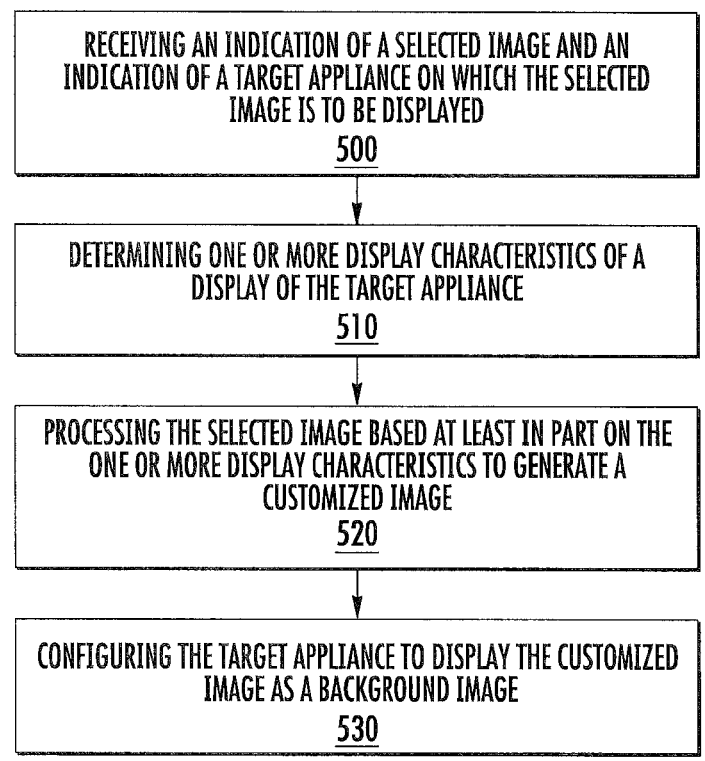
Figure 6:
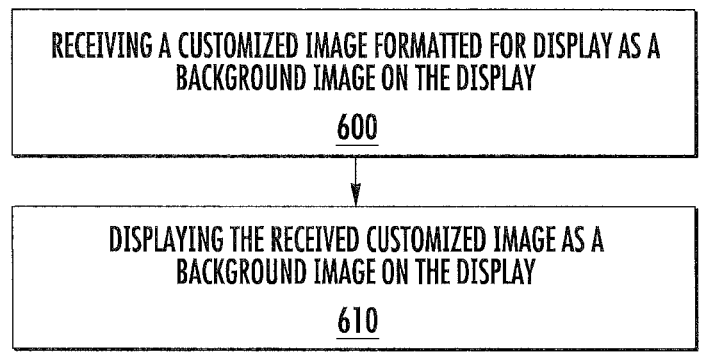
Figure 7A:
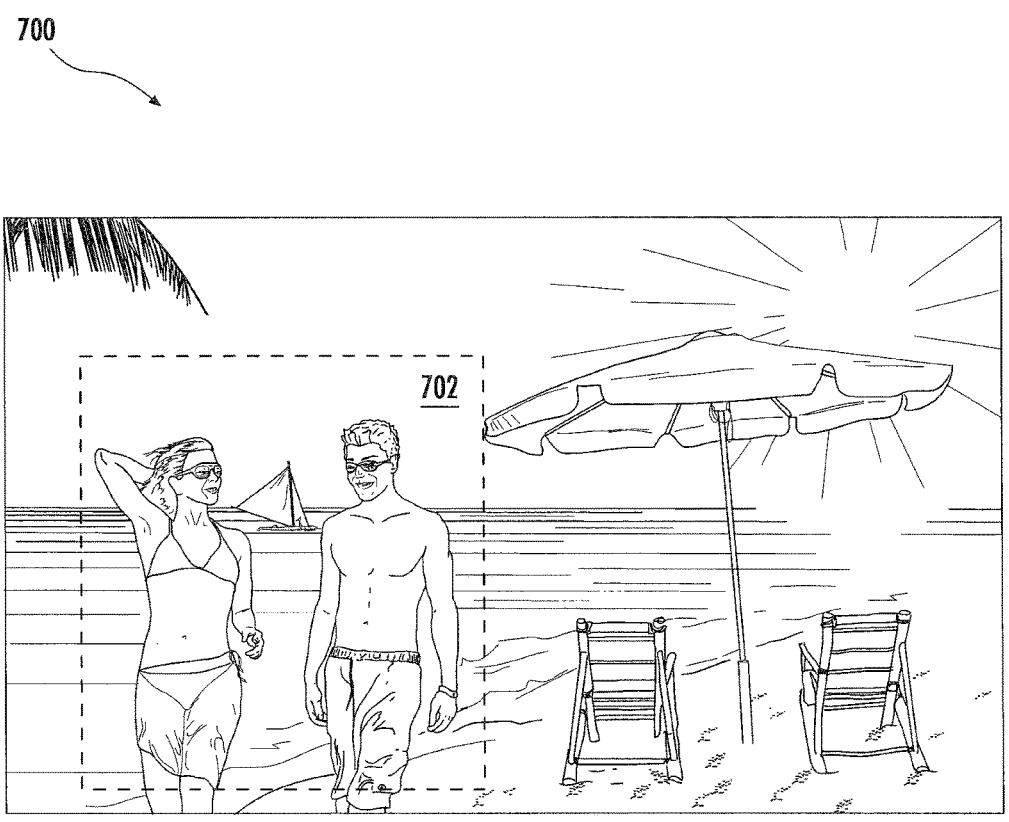
Figure 7B:
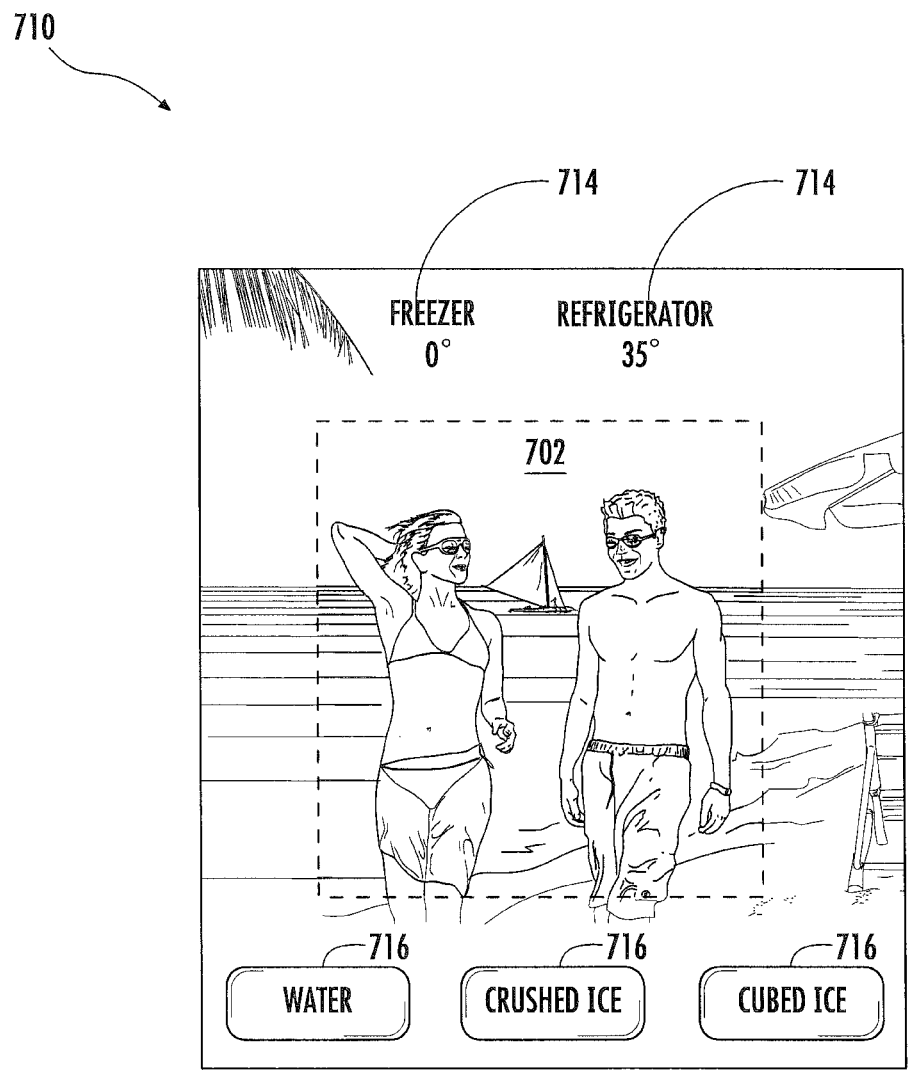
Figure 7C:
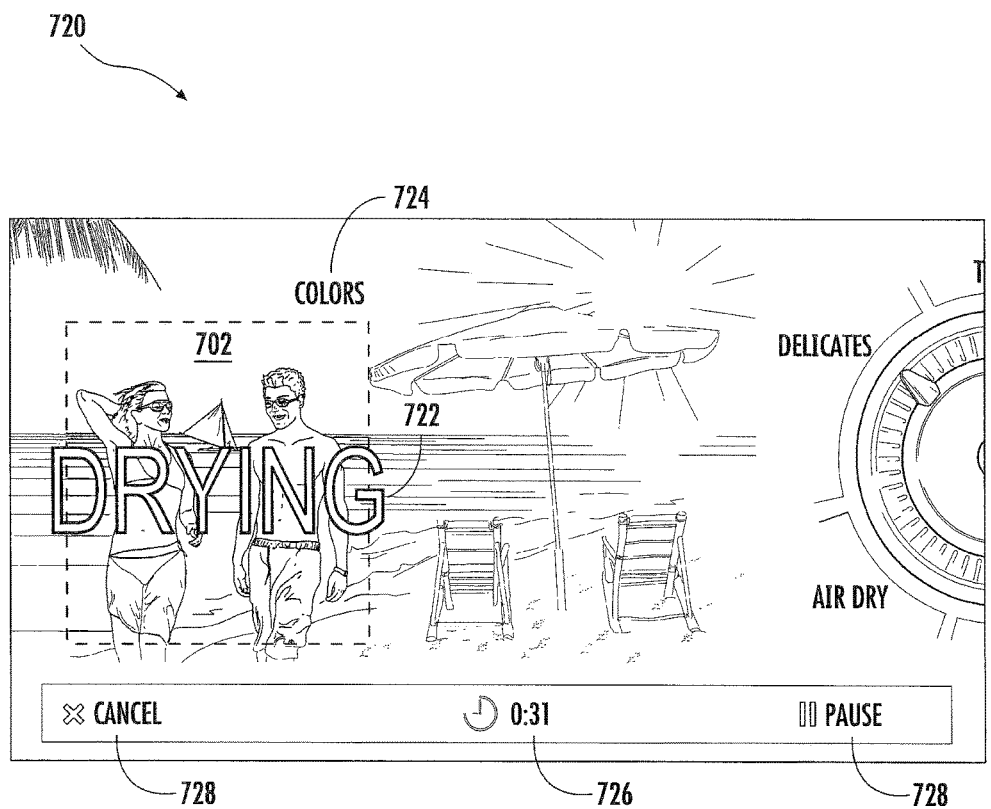

Having thus described the disclosure in general terms, reference will now be made to the accompanying drawings, which are not necessarily drawn to scale, and wherein:

FIG. 1 illustrates a system for customizing an appliance display in accordance with some example embodiments;

FIG. 2 illustrates another system for customizing an appliance display in accordance with some example embodiments;

FIG. 3 illustrates a block diagram of an apparatus for customizing an appliance display in accordance with some example embodiments;

FIG. 4 illustrates a block diagram of an apparatus that may be implemented on an appliance in accordance with some example embodiments;

FIG. 5 illustrates a flowchart according to an example method for customizing an appliance display in accordance with some example embodiments;

FIG. 6 illustrates a flowchart according to an example method that may be performed by an appliance in accordance with some example embodiments; and FIGS. 7A-7C illustrate customization of an example image for example appliance displays in accordance with some example embodiments.

DETAILED DESCRIPTION

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

FIG. 1 illustrates a system 100 for customizing an appliance display in accordance with some example embodiments. The system 100 may include one or more network connected appliances 102. By way of example, network connected appliances 102-1, 102-2, and 102-n are illustrated. However, it will be appreciated that the system 100 may include any number of network connected appliances 102, and that each network connected appliance 102 may be any of a variety of appliances. By way of example, in some embodiments, a network connected appliance 102 may be a household appliance, such as by way of non-limiting example, a dishwasher, washing machine, clothes dryer, refrigerator, freezer, oven, range, cooktop, microwave oven, trash compactor, air conditioner, water heater, some combination thereof, or other household appliance.

The network connected appliances 102 may be connected to a network 104. The network 104 may be embodied as any network, or combination of networks, which may enable two or more computing devices to communicate with each other. In this regard, the network 104 may, for example, comprise one or more wireline networks, one or more wireless networks (e.g., a cellular network, WLAN, wireless wide area network, some combination thereof, or the like), or a combination thereof, and in some example embodiments may comprise the Internet. Each network connected appliance 102 may be connected to the network 104 through any of a variety of network connectivity means. For example, in some embodiments, a network connected appliance 102 may include a communication interface supporting a connection to a home local area network (LAN), such as a WLAN, a wired LAN, a power line network, some combination thereof, or other LAN, which may, in turn, be connected to a wide area network, such as the Internet. As another example, in some embodiments, a network connected appliance 102 may include a cellular communication interface supporting a cellular connection to the network 104. It will be appreciated, however, that any technology that may be used to connect a device to a network is contemplated within the scope of the disclosure.

A network connected appliance 102 may include one or more displays, such as LCD displays, OLED displays, and/or other displays. A display on a network connected appliance 102 may be configured to display a graphical user interface during operation of the network connected appliance 102. The graphical user interface may include operating status information for the network connected appliance 102. For example, a graphical user interface that may be displayed on a refrigerator display may include an indication of an operating temperature of the refrigerator, an indication of a mode (e.g., crushed/cubed) of an ice dispenser, and/or other status information that may be indicative of a setting or mode of the refrigerator. As a further example, a graphical user interface that may be displayed on a dishwasher, washing machine, clothes dryer, and/or other appliance that may have timed cycles may display a time remaining for a cycle. In embodiments in which a network connected appliance 102 includes a touch screen display, the graphical user interface may additionally or alternatively include selectable control options, such as mode selection options, temperature adjustment options, and/or other control options that may be used through input of a touch gesture to the touch screen display to adjust and/or otherwise control operating parameters of the network connected appliance 102.

A display of a network connected appliance 102 may be configured to display a background image underlying the graphical user interface. In this regard, the background image may be used for decorative purposes (e.g., as wallpaper for the graphical user interface) with operating status information, selectable control options, and/or other elements of the graphical user interface being displayed overlying the background image. As displays of different network connected appliances 102 may have different display characteristics, the properties of a background image format supported by a first network connected appliance 102 may differ from properties of a background image format supported by a second network connected appliance 102.

The system 100 may further include a customization service apparatus 106, which may comprise one or more computing devices that may be configured to provide appliance customization services in accordance with one or more example embodiments. The customization service apparatus 106 may include one or more servers, such as may be provided by one or more blade servers, a cloud computing infrastructure, and/or the like, which may be collectively configured to provide a customization service for customizing a display of a network connected appliance 102 in accordance with one or more example embodiments. In some example embodiments in which the customization service apparatus 106 is embodied as a distributed computing apparatus comprising multiple computing devices, the respective devices that comprise the customization service apparatus 106 may be in communication with each other via a network, such as the network 104.

The system 100 may additionally include one or more user terminals 108. A user terminal 108 may be embodied as any computing device that may be used by a user and that may be configured to access the network 104. By way of non-limiting example, a user terminal 108 may be embodied as a personal computer (e.g., desktop computer, laptop computer, or other personal computer), a mobile computing device (e.g., a smart phone, tablet computer, digital camera, some combination thereof, or other mobile computing device), or the like. The user terminal 108 may be configured to use any of a variety of network access technologies to access the network 104 in various embodiments, including, by way of non-limiting example, a LAN access technology, such as a WLAN access technology, a cellular access technology, and/or other wireless and/or wireline network access technology. A user terminal 108 may, for example, be associated with an owner or other user of one or more network connected appliances 102.

The customization service apparatus 106 may be configured to provide an interface, such as a web-based interface, that may be accessed by the user terminal 108 over the network 104. For example, the web-based interface that may be provided by the customization service apparatus 106 of some example embodiments may be accessed via a client application that may be installed on the user terminal 108. As a more particular example, in some embodiments, the customization service apparatus may provide a web page that may be accessed by a browser application that may be installed on the user terminal 108. As another example, in some embodiments, the user terminal 108 may have a dedicated application (e.g., a mobile app in some embodiments in which the user terminal 108 is embodied as a mobile computing device) that may be configured to access and/or otherwise interact with a web-based interface or other interface that may be provided by the customization service apparatus 106.

The interface may be configured to enable a user of the user terminal 108 to select an image to have customized for display as a background image on a network connected appliance 102. For example, in some embodiments, the interface may provide the user with a plurality of available images, such as may be stored on the customization service apparatus 106 and/or that may otherwise be accessible by the customization service apparatus 106 and/or user terminal 108, such as via the network 104. As another example, in some embodiments, the interface may additionally or alternatively enable a user to upload an image that may be stored on and/or otherwise accessible by the user terminal 108 to the customization service apparatus 106. For example, in some embodiments in which the user terminal 108 is a mobile computing device including a digital camera, the user terminal 108 may upload an image captured by the user terminal 108 to the customization service apparatus 106.

The interface may further enable a user to select a target network connected appliance 102 on which the user wishes to have the selected image displayed as a background image. For example, in some embodiments, the user may have a user account to which one or more network connected appliances 102 owned by and/or otherwise associated with the user may be registered. The user may log into this account when accessing the customization service provided by the customization service apparatus 106 and/or the customization service apparatus 106 may otherwise be configured to determine the appropriate user account, such as based on an association between the user terminal 108 and/or an application implemented thereon and the user account. The customization service apparatus 106 may be configured to present the network connected appliance(s) 102 associated with the user account as selectable options on the interface, and the user may select the desired target network connected appliance 102 via the interface.

As another example, in some embodiments, the customization service apparatus 106 may be configured to provide an interface enabling a user to filter or otherwise select a target appliance through information that may be used to identify the appliance, such as appliance type (e.g., refrigerator, dishwasher, clothes dryer, oven, etc.), appliance manufacturer, year of manufacture, model number, and/or other identifying information that may be used to identify an appliance. As another example, in some embodiments, the interface may additionally or alternatively be configured to enable a user to enter a product serial number and/or other identifier that may be associated with an appliance and which may be used to uniquely identify a target network connected appliance 102. As still a further example, in some embodiments, the interface may additionally or alternatively be configured to enable a user to enter a network address, such as an Internet Protocol (IP) address, media access control (MAC) address, and/or other network address of the desired target network connected appliance 102 that may be used to identify and communicate with the appliance on the network 104.

In an instance in which the target network connected appliance 102 has multiple displays, the interface may further be configured to enable the user to select the desired display on which the selected image is to be displayed.

It will be appreciated that embodiments are not limited to the ordering of the selection of an image and the selection of a target network connected appliance 102. In this regard, a user may first select an image and then select a target network connected appliance 102 and/or may first select a target network connected appliance 102 and then select an image for customization for display on the target network connected appliance 102 within the scope of the disclosure. As another example, in some embodiments, both the image and the target network connected appliance 102 may be selected concurrently.

The customization service apparatus 106 may be further configured to determine one or more display characteristics of the display of the target network connected appliance 102. For example, the customization service apparatus 106 may store and/or otherwise have access to display characteristics of displays of each of a plurality of appliance models. This information may, for example, be maintained in the form of a database and/or other data structure through which the customization service apparatus 106 may look up an appliance (e.g., by model or other identifying information) and determine display characteristics of a display of the appliance.

For example, a display characteristic may include a size of the display, such as may define dimensions (e.g., height and width) of the display in terms of a unit of measure, such as inches, centimeters, pixels, and/or other unit of measure in which dimensions of a display may be defined. As another example, a display characteristic may include an orientation of the display (e.g., landscape versus portrait). As still a further example, a display characteristic may include a resolution of the display. Another example display characteristic may include color capabilities of a display, such as may be expressed in terms of whether the display is color or just gray scale, which colors supported by the display, a bit depth (e.g., a number of bits used to indicate the color of a pixel and/or a color component of a pixel) supported by the display, and/or other color capabilities of a display. As still a further example, a display characteristic may include an image file format(s) (e.g., JPEG, GIF, BMP, PNG, TIFF, and/or other image file format) supported by one or more of the display or the target network connected appliance 102. As yet another example, a display characteristic may include an image file size, such a maximum file size, minimum file size, supported range of file sizes, and/or the like, supported by one or more of the display or the target network connected appliance.

The customization service apparatus 106 may be further configured to process the selected image to generate a customized image formatted for display as a background image on the display of the target network connected appliance 102. The processing may be performed based at least in part on the determined display characteristics of the display. For example, the selected image may be processed to generate a customized image formatted to satisfy any constraints of the display. Additionally or alternatively, the selected image may be processed to generate a customized image that is formatted to enhance visibility of at least a portion of the image when displayed as a background image on the display.

As a more particular example, processing the selected image may include performing image scaling on the selected image, cropping the selected image, and/or otherwise resizing the selected image based at least in part on a size of the display, orientation of the display, and/or resolution of the display such that the customized image is sized to fit the display. As another example, processing the selected image may additionally or alternatively include modifying a bit depth of the selected image to generate a customized image having a bit depth corresponding to a bit depth supported by the display. In some embodiments, processing the selected image may additionally or alternatively include performing color swapping within a portion of the image, performing color approximation within a portion of the image, and/or applying dithering to a portion of the image to generate a customized image complying with color capabilities of the display. As a further example, in some embodiments, the processing may include converting the selected image from a first file format to a second file format in an instance in which a file format of the selected image is not supported by the display and/or by the target network connected appliance 102.

In some example embodiments, processing the selected image may include identifying a region of interest (ROI) within the image. For example, in some such embodiments, the ROI may be selected by the user via the interface that may be provided by the customization service apparatus 106. Additionally or alternatively, in some such embodiments, the ROI may be autonomously identified by the customization service apparatus 106 based on analysis of the image. For example, in some embodiments, a face sensing algorithm may be applied to identify a region containing any persons that may be depicted in the image as an ROI. As another example, in some embodiments a point of focus of the image may be identified through analysis of the image and the point of focus may be determined to be an ROI. As still a further example, in some embodiments, the selected image may be analyzed to separate any foreground objects from the background and a region containing one or more foreground objects may be determined to be an ROI.

In embodiments in which an ROI of a selected image is identified, the selected image may be processed to generate a customized image formatted such that the ROI is visible when displayed as a background image on the display of the target network connected appliance 102. For example, ROI may be positioned within the customized image such that the ROI is not obscured by elements of the overlying graphical user interface when displayed as a background image. As another example, in instances in which the selected image is scaled, cropped, or otherwise resized to fit the display, the processing of the image may be performed so that the ROI is the point of focus of the customized image and/or such that the ROI is not cut out of the customized image, distorted in the customized image, or otherwise adversely impacted by the processing.

The customization service apparatus 106 may be further configured to configure the target network connected appliance 102 to display the customized image as a background image on the display. Configuration of the target network connected appliance 102 may include the customization service apparatus 106 sending the customized image to the target network connected appliance 102 via the network 104. In some example embodiments, the customization service apparatus 106 may additionally send instructions and/or other indication to the target network connected appliance 102 that the customized image received by the target network connected appliance 102 is to be displayed as a background image on the display.

FIG. 2 illustrates another system for customizing an appliance display in accordance with some example embodiments. In this regard, the system 200 illustrates an embodiment in which at least some aspects of the centralized customization service, such as may be provided by the customization service apparatus 106 described above, may be omitted and at least a portion of the functionality of the customization service apparatus 106 discussed with respect to FIG. 1 may be performed by a user terminal, such as user terminal 208.

Referring now to FIG. 2, the system 200 may include one or more network connected appliances 202. By way of example, network connected appliances 202-1, 202-2, and 202-n are illustrated. However, it will be appreciated that the system 200 may include any number of network connected appliances 202, and that each network connected appliance 202 may be any of a variety of appliances. A network connected appliance 202 may be an embodiment of a network connected appliance 102 and, as such, may include on or more displays on which a background image may be displayed.

The network connected appliances 202 may be connected to a network 204. The network 204 may be embodied as any network, or combination of networks, which may enable two or more computing devices to communicate with each other. In this regard, the network 204 may, for example, comprise one or more wireline networks, one or more wireless networks (e.g., a cellular network, WLAN, wireless wide area network, some combination thereof, or the like), or a combination thereof, and in some example embodiments may comprise the Internet. Each network connected appliance 202 may be connected to the network 204 through any of a variety of network connectivity means. For example, in some embodiments, a network connected appliance 202 may include a communication interface supporting a connection to a home local area network (LAN), such as a WLAN, a wired LAN, a power line network, some combination thereof, or other LAN. In embodiments in which the network 204 includes the Internet and/or some other wide area network, a LAN with which a network connected appliance 202 may be connected may, in turn, be connected to the wide area network(s). As another example, in some embodiments, a network connected appliance 202 may include a cellular communication interface supporting a cellular connection to the network 204. It will be appreciated, however, that any technology that may be used to connect a device to a network is contemplated within the scope of the disclosure.

The system 200 may additionally include a user terminal 208. A user terminal 208 may be embodied as any computing device that may be used by a user and that may be configured to access the network 204. By way of non-limiting example, a user terminal 208 may be embodied as a personal computer (e.g., desktop computer, laptop computer, or other personal computer), a mobile computing device (e.g., a smart phone, tablet computer, digital camera, some combination thereof, or other mobile computing device), or the like. The user terminal 208 may be configured to use any of a variety of network access technologies to access the network 204 in various embodiments, including, by way of non-limiting example, a LAN access technology, such as a WLAN access technology, a cellular access technology, and/or other wireless and/or wireline access technology. A user terminal 208 may, for example, be associated with an owner or other user of one or more network connected appliances 202.

The user terminal 208 may be configured to provide an interface enabling a user to customize a display of a network connected appliance 202. The interface may, for example, be provided by an application, such as a mobile app, that may be implemented on the user terminal 208.

The interface may be configured to enable a user of the user terminal 208 to select an image to have customized for display as a background image on a network connected appliance 202. For example, in some embodiments, the interface may provide the user with a plurality of available images, such as may be stored on the user terminal 208 and/or that may otherwise be accessible by the user terminal 208, such as via the network 204. As another example, in some embodiments, the interface may additionally or alternatively enable a user to navigate a local and/or remote file structure and/or otherwise browse to select an image that may be stored on and/or otherwise accessible by the user terminal 208.

The interface may additionally be configured to enable a user to select a target network connected appliance 202 on which the user wishes to have a selected image displayed as a background image. For example, in some embodiments, the user may have a user account to which one or more network connected appliances 202 owned by and/or otherwise associated with the user may be registered. The user terminal 208 may have access to account information associated with the user account, and may be configured to present the network connected appliance(s) 202 associated with the user account as selectable options on the interface, and the user may select the desired target network connected appliance 202 via the interface. As another example, in some embodiments, the interface may be additionally or alternatively configured to enable a user to filter or otherwise select a target appliance through information that may be used to identify the appliance, such as appliance type (e.g., refrigerator, dishwasher, clothes dryer, oven, etc.), appliance manufacturer, year of manufacture, model number, and/or other identifying information that may be used to identify an appliance. As a further example, in some embodiments, the interface may additionally or alternatively be configured to enable a user to enter a product serial number and/or other identifier that may be associated with an appliance and which may be used to uniquely identify a target network connected appliance 202. As still a further example, in some embodiments, the interface may additionally or alternatively be configured to enable a user to enter a network address, such as an Internet Protocol (IP) address, media access control (MAC) address, and/or other network address of the desired target network connected appliance 202 that may be used to identify and communicate with the appliance on the network 204. In some embodiments, if the user terminal 208 and one or more network connected appliances 202 are connected to the same local area network, such as a home WLAN, the user terminal 208 may be configured to detect network connected appliances 202 on the network and present any detected network connected appliances 202 to the user as selectable options via the interface.

In an instance in which a selected target network connected appliance 202 has multiple displays, the interface may further be configured to enable the user to select the desired display on which the selected image is to be displayed.

It will be appreciated that embodiments are not limited to the ordering of the selection of an image and the selection of a target network connected appliance 202. In this regard, a user may first select an image and then select a target network connected appliance 202 and/or may first select a target network connected appliance 202 and then select an image for customization for display on the target network connected appliance 202 within the scope of the disclosure. As another example, in some embodiments, both the image and the target network connected appliance 202 may be selected concurrently.

The user terminal 208 may be further configured to determine one or more display characteristics of the display of the target network connected appliance 202. The determined display characteristics may include any of the display characteristics discussed above with respect to FIG. 1. The user terminal 208 may additionally be configured to process the selected image to generate a customized image formatted for display as a background image on the display of the target network connected appliance 202 based at least in part on the one or more determined display characteristics. The user terminal 208 may, for example, be configured to use any one or more of the image processing techniques discussed above with respect to the customization service apparatus 106 to generate the customized image.

The user terminal 208 may be further configured to configure the target network connected appliance 202 to display the customized image as a background image on the display. Configuration of the target network connected appliance 202 may include the user terminal 208 sending the customized image to the target network connected appliance 202 via the network 204. In some example embodiments, the user terminal 208 may additionally send instructions and/or other indication to the target network connected appliance 202 that the customized image received by the target network connected appliance 202 is to be displayed as a background image on the display.

FIG. 3 illustrates a block diagram of an apparatus 300 for customizing an appliance display in accordance with some example embodiments. In this regard, the apparatus 300 may be implemented on a user terminal, such as user terminal 108 and/or user terminal 208, and/or on an apparatus providing a customization service, such as customization service apparatus 106, in accordance with various example embodiments. As such, it will be appreciated that elements of the apparatus 300 may be implemented on a single computing device, or, in some embodiments, may be distributed across a plurality of computing devices collectively providing customization services in accordance with one or more example embodiments.

It will be appreciated that the components, devices or elements illustrated in and described with respect to FIG. 3 below may not be mandatory and thus some may be omitted in certain embodiments. Additionally, some embodiments may include further or different components, devices or elements beyond those illustrated in and described with respect to FIG. 3.

In some example embodiments, the apparatus 300 may include processing circuitry 310 that is configurable to perform functions in accordance with one or more example embodiments disclosed herein. In this regard, the processing circuitry 310 may be configured to perform and/or control performance of one or more functionalities of apparatus 300 (e.g., functionalities of user terminal 108, user terminal 208, and/or customization service apparatus 106) in accordance with various example embodiments. Thus, the processing circuitry 310 may be configured to perform data processing, application execution and/or other processing and management services according to one or more example embodiments.

In some embodiments, the apparatus 300 or a portion(s) or component(s) thereof, such as the processing circuitry 310, may include one or more chipsets, which may each include one or more chips. The processing circuitry 310 and/or one or more further components of the apparatus 300 may therefore, in some instances, be configured to implement an embodiment on a chipset.

In some example embodiments, the processing circuitry 310 may include a processor 312 and, in some embodiments, such as that illustrated in FIG. 3, may further include memory 314. The processing circuitry 310 may be in communication with or otherwise control a communication interface 316, user interface 318, and/or display customization module 320.

The processor 312 may be embodied in a variety of forms. For example, the processor 312 may be embodied as various hardware processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 312 may comprise a plurality of processors. The plurality of processors may be in operative communication with each other and may be collectively configured to perform one or more functionalities of the apparatus 300. In some embodiments in which the apparatus 300 is embodied as a plurality of computing devices a plurality of processors, which may collectively form the processor 312, may be distributed across a plurality of computing devices that may be in operative communication with each other directly and/or via a network, such as the network 104 and/or network 204. In some example embodiments, the processor 312 may be configured to execute instructions that may be stored in the memory 314 and/or that may be otherwise accessible to the processor 312. As such, whether configured by hardware or by a combination of hardware and software, the processor 312 capable of performing operations according to various embodiments while configured accordingly.

In some example embodiments, the memory 314 may include one or more memory devices. Memory 314 may include fixed and/or removable memory devices. In embodiments in which the memory 314 includes a plurality of memory devices, the plurality of memory devices may be embodied on a single computing device, or may be distributed across a plurality of computing devices, which may collectively provide functionality of the apparatus 300. In some embodiments, the memory 314 may provide a non-transitory computer-readable storage medium that may store computer program instructions that may be executed by the processor 312. In this regard, the memory 314 may be configured to store information, data, applications, instructions and/or the like for enabling the apparatus 300 to carry out various functions in accordance with one or more example embodiments. In some embodiments, the memory 314 may be in communication with one or more of the processor 312, communication interface 316, user interface 318, or display customization module 320 via a bus(es) for passing information among components of the apparatus 300.

The apparatus 300 may further include a communication interface 316. The communication interface 316 may enable the apparatus 300 to communicate with one or more further computing devices, such as over a network (e.g., network 104 and/or network 204). In this regard, the communication interface 316 may include one or more interface mechanisms for enabling communication with other devices and/or networks. As such, the communication interface 316 may include, for example, an antenna (or multiple antennas) and supporting hardware and/or software for enabling communications with a wireless communication network (e.g., a cellular network, Wi-Fi, WLAN, and/or the like) and/or a communication modem or other hardware/software for supporting communication via cable, digital subscriber line (DSL), USB, FireWire, Ethernet, one or more optical transmission technologies, and/or other wireline networking methods. Thus, for example, in embodiments in which the apparatus 300 is implemented on customization service apparatus 106, the communication interface 316 may be configured to enable communication with a user terminal, such as user terminal 108, to facilitate user selection of an image, a target network connected appliance, and/or other parameters for customizing a network connected appliance, such as a network connected appliance 102. As another example, the communication interface 316 may be configured to enable communication with a network connected appliance (e.g., a network connected appliance 102 and/or network connected appliance 202), such as to configure the network connected appliance to display a customized image as a background image.

In some example embodiments, the apparatus 300 may include the user interface 318. It will be appreciated, however, that in some example embodiments, one or more aspects of the user interface 318 may be omitted, and in some embodiments, the user interface 318 may be omitted entirely. The user interface 318 may be in communication with the processing circuitry 310 to receive an indication of a user input and/or to provide an audible, visual, mechanical, or other output to a user. As such, the user interface 318 may include, for example, a keyboard, a mouse, a joystick, a display, a touch screen display, a microphone, a speaker, one or more biometric input devices (e.g., a visual or sensorial tracing device that may track body part or eye movements), and/or other input/output mechanisms. In embodiments wherein the user interface 318 comprises a touch screen display and/or a three-dimensional (3D) display (e.g., a stereoscopic display, holographic display, and/or other display that may display an image that may be perceived by a user to be in 3D with and/or without the assistance of 3D glasses or other separate 3D optical assistance device), the user interface 318 may additionally be configured to detect and/or receive an indication of a touch and/or other movement gesture or other input to the display.

The apparatus 300 may further include display customization module 320. The display customization module 320 may be embodied as various means, such as circuitry, hardware, a computer program product comprising computer readable program instructions stored on a computer readable medium (for example, the memory 314) and executed by a processing device (for example, the processor 312), or some combination thereof. In some embodiments, the processor 312 (or the processing circuitry 310) may include, or otherwise control the display customization module 320.

The display customization module 320 of some example embodiments may be configured to provide an interface enabling a user to select an image and a target appliance (e.g., a network connected appliance 102 and/or a network connected appliance 202) on which the image is to be displayed as a background image. In some example embodiments, the display customization module 320 may be configured to process a selected image to generate a customized image formatted for display as a background image on a display of the target appliance. The display customization module 320 of such example embodiments may, for example, be configured to apply any of the processing techniques discussed above to generate the customized image. In some example embodiments, the display customization module 320 may be further configured to configure the target appliance to display the customized image as a background image.

FIG. 4 illustrates a block diagram of an apparatus 400 that may be implemented on an appliance, such as a network connected appliance 102 and/or network connected appliance 202, in accordance with some example embodiments. It will be appreciated that the components, devices or elements illustrated in and described with respect to FIG. 4 below may not be mandatory and thus some may be omitted in certain embodiments. Additionally, some embodiments may include further or different components, devices or elements beyond those illustrated in and described with respect to FIG. 4.

In some example embodiments, the apparatus 400 may include processing circuitry 410 that is configurable to perform functions in accordance with one or more example embodiments disclosed herein. In this regard, the processing circuitry 410 may be configured to perform and/or control performance of one or more functionalities of apparatus 400 (e.g., functionalities of a network connected appliance 102 and/or network connected appliance 202) in accordance with various example embodiments. Thus, the processing circuitry 410 may be configured to perform data processing, application execution and/or other processing and management services according to one or more example embodiments.

In some embodiments, the apparatus 400 or a portion(s) or component(s) thereof, such as the processing circuitry 410, may include one or more chipsets, which may each include one or more chips. The processing circuitry 410 and/or one or more further components of the apparatus 400 may therefore, in some instances, be configured to implement an embodiment on a chipset.

In some example embodiments, the processing circuitry 410 may include a processor 412 and, in some embodiments, such as that illustrated in FIG. 4, may further include memory 414. The processing circuitry 410 may be in communication with or otherwise control a communication interface 416, display 418, and/or display control module 420.

The processor 412 may be embodied in a variety of forms. For example, the processor 412 may be embodied as various hardware processing means, such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 412 may comprise a plurality of processors. The plurality of processors may be in operative communication with each other and may be collectively configured to perform one or more functionalities of the apparatus 400. In some example embodiments, the processor 412 may be configured to execute instructions that may be stored in the memory 414 and/or that may be otherwise accessible to the processor 412. As such, whether configured by hardware or by a combination of hardware and software, the processor 412 may be capable of performing operations according to various embodiments while configured accordingly.

In some example embodiments, the memory 414 may include one or more memory devices. Memory 414 may include fixed and/or removable memory devices. In some embodiments, the memory 414 may provide a non-transitory computer-readable storage medium that may store computer program instructions that may be executed by the processor 412. In this regard, the memory 414 may be configured to store information, data, applications, instructions and/or the like for enabling the apparatus 400 to carry out various functions in accordance with one or more example embodiments. In some embodiments, the memory 414 may be in communication with one or more of the processor 412, communication interface 416, display 418, or display control module 420 via a bus(es) for passing information among components of the apparatus 400.

The apparatus 400 may further include a communication interface 416. The communication interface 416 may enable the apparatus 400 to communicate with one or more further computing devices, such as over a network (e.g., network 104 and/or network 204). In this regard, the communication interface 416 may include one or more interface mechanisms for enabling communication with other devices and/or networks. As such, the communication interface 416 may include, for example, an antenna (or multiple antennas) and supporting hardware and/or software for enabling communications with a wireless communication network (e.g., a cellular network, Wi-Fi, WLAN, and/or the like) and/or a communication modem or other hardware/software for supporting communication via cable, digital subscriber line (DSL), USB, FireWire, Ethernet, one or more optical transmission technologies, and/or other wireline networking methods. As a non-limiting example, the communication interface 416 of some example embodiments may be configured to enable communication with a device, such as customization service apparatus 106 and/or user terminal 208, to receive a customized image for display as a background image on the display 418.

In some example embodiments, the apparatus 400 may include the display 418. The display 418 may be embodied as any type of display, such as by way of non-limiting example, an LCD display, OLED display, or other type of display. In some example embodiments, the display 418 may be a touch screen display. Additionally or alternatively, in some example embodiments, the display 418 may be embodied as a three-dimensional (3D) display (e.g., a stereoscopic display, holographic display, and/or other display that may display an image that may be perceived by a user to be in 3D with and/or without the assistance of 3D glasses or other separate 3D optical assistance device). In some example embodiments, such as some embodiments in which the display 418 is embodied as a touch screen display, the display 418 may additionally be configured to detect and/or receive an indication of a touch and/or other movement gesture or other input to the display 418.

The display 418 may be configured to display a graphical user interface during operation of an appliance on which the apparatus 400 may be implemented. The graphical user interface may include operating status information for the appliance. In some embodiments, such as some embodiments in which the display 418 comprises a touch screen display, the graphical user interface may additionally or alternatively include selectable control options, such as mode selection options, temperature adjustment options, and/or other control options that may be used through input of a touch gesture to the touch screen display to adjust and/or otherwise control operating parameters of an appliance on which the apparatus 400 may be implemented. The display 418 may be further configured to display a background image underlying the graphical user interface.

The apparatus 400 may further include display control module 420. The display control module 420 may be embodied as various means, such as circuitry, hardware, a computer program product comprising computer readable program instructions stored on a computer readable medium (for example, the memory 414) and executed by a processing device (for example, the processor 412), or some combination thereof. In some embodiments, the processor 412 (or the processing circuitry 410) may include, or otherwise control the display control module 420. The display control module 420 may be configured to control the display of a graphical user interface, background images, and/or other images and/or information on the display 418. For example, the display control module 420 of some example embodiments may be configured to control display of a customized image that may be provided by the customization service apparatus 106 and/or user terminal 208 as a background image on the display 418.

FIG. 5 illustrates a flowchart according to an example method for customizing an appliance display in accordance with some example embodiments. In some example embodiments, one or more of the operations illustrated in and described with respect to FIG. 5 may be performed by an apparatus providing a customization service, such as the customization service apparatus 106. Additionally or alternatively, in some example embodiments, one or more of the operations illustrated in and described with respect to FIG. 5 may be performed by a user terminal, such as user terminal 108 and/or user terminal 208. One or more of processing circuitry 310, processor 312, memory 314, communication interface 316, user interface 318, or display customization module 320 may, for example, provide means for performing one or more of the operations illustrated in and described with respect to FIG. 5.

Operation 500 may include receiving an indication of a selected image and an indication of a target appliance (e.g., a target network connected appliance 102 or target network connected appliance 202) on which the selected image is to be displayed. For example, in some embodiments, operation 500 may include the customization service apparatus 106 receiving an indication of the selected image and an indication of the target appliance sent to the customization service apparatus 106 by the user terminal 108 over the network 104. In some such embodiments, the customization service apparatus 106 may provide providing a web-based interface accessible by the user terminal 108 over the network 104, and operation 500 may include receiving the indication of the selected image and the indication of the target appliance in response to user interaction with the web-based interface on the user terminal 108. As another example, in some embodiments, operation 500 may include the user terminal 208 receiving the indication of the selected image and the indication of the target appliance via an application that may be implemented on the user terminal 208.

Operation 510 may include determining one or more display characteristics of a display of the target appliance. In instances in which the target appliance includes multiple displays capable of displaying a background image, operation 510 may further include receiving an indication of a selected display on which the selected image is to be displayed as a background image.

Operation 520 may include processing the selected image based at least in part on the one or more display characteristics determined in operation 510 to generate a customized image. The customized image may be formatted for display as a background image on the display of the target appliance. Operation 520 may, for example, include applying any one or more of the image processing techniques discussed above to generate a customized image formatted for display on the display.

Operation 530 may include configuring the target appliance to display the customized image as a background image. In this regard, the target appliance may be configured to display the customized image underlying a graphical user interface that may be displayed on the display during operation of the target appliance.

In some example embodiments, operation 530 may include sending the customized image to the target appliance via a network. For example, in some embodiments, operation 530 may include the customization service apparatus 106 sending the customized image to a target network connected appliance 102 via the network 104. As another example, in some embodiments, operation 530 may include the user terminal 208 sending the customized image to a target network connected appliance 202 via the network 204.

FIG. 6 illustrates a flowchart according to an example method that may be performed by an appliance, such as a network connected appliance 102 and/or a network connected appliance 202, in accordance with some example embodiments. One or more of processing circuitry 410, processor 412, memory 414, communication interface 416, display 418, or display control module 420 may, for example, provide means for performing one or more of the operations illustrated in and described with respect to FIG. 6.

Operation 600 may include receiving a customized image formatted for display as a background image on the display 418. For example, operation 600 may include receiving a customized image that may be sent by the customization service apparatus 106 or user terminal 208 attendant to performance of operation 530.

Operation 610 may include displaying the received customized image as a background image on the display 418. In this regard, the customized image may be displayed underlying a graphical user interface that may be displayed on the display 418 during operation of the target appliance.

FIGS. 7A-7C illustrate customization of an example image for example appliance displays in accordance with some example embodiments. Referring first to FIG. 7A, an example image 700 is illustrated. The image may include two people standing on a beach in the foreground with the ocean and sky in the background. In accordance with some example embodiments, processing of the image 700, such as by the display customization module 320, may result in the region 702 surrounding the two people as a region of interest within the image 700.

Referring now to FIG. 7B, FIG. 7B illustrates an example display 710 of a refrigerator in which a customized image that may be generated from processing the image 700 is displayed as a background image. The display 710 may, for example, be an embodiment of the display 418. The display 710 may have a portrait orientation in which the height of the display 710 may be greater than the width of the display 710. As such, in the example of FIG. 7B, the image 700 may be processed to reduce a width of the image 700 relative to the height of the image 700 for display in the display 710. Further, the customized image may be formatted such that the region of interest 702 is the focus of the customized image and visibly displayed in the display 710 (e.g., in the central portion of the display 710).

As further illustrated in the example of FIG. 7B, the customized background image may be displayed underlying a graphical user interface for the refrigerator. The graphical user interface may, for example, include operating status information 714, which may be indicative of an operating temperature(s) of the refrigerator. The graphical user interface may additionally or alternatively include one or more selectable control options 716 for controlling an operating mode of the refrigerator, such as, by way of non-limiting example, an operating mode of an in-door water/ice dispenser. In this regard, the operating status information 714 and/or selectable control options 716 may be displayed overlying one or more portions of the customized background image.

Turning to FIG. 7C, FIG. 7C illustrates an example display 720 of a clothes dryer in which a customized image that may be generated from processing the image 700 is displayed as a background image. The display 720 may, for example, be an embodiment of the display 418. The display 720 may have a landscape orientation in which the width of the display 720 may be greater than the height of the display 720. As such, in the example of FIG. 7C, the image 700 may be processed to reduce a height of the image 700 relative to the width of the image 700 for display in the display 720. For example, a portion of the sky in the background of the image 700 and a portion of the beach in the foreground of the image 700 may be cropped or otherwise eliminated through processing of the image such that the region of interest 702 remains a visible region of focus within the customized image when displayed within the display 720.

As further illustrated in the example of FIG. 7C, the customized background image may be displayed underlying a graphical user interface for the clothes dryer. The graphical user interface in the example of FIG. 7C may, for example, include operating status information 722, which may indicate that the clothes dryer is "drying" a load of clothes. The graphical user interface may further include operating status information 724 indicative of a drying mode (e.g., "colors") of the clothes dryer. Operating status information 726 may indicate a time remaining in the drying cycle. Selectable control options 728 may provide options for a user to pause or cancel the drying cycle. As such, the operating status information 722, operating status information 724, operating status information 726, and/or selectable control options 728 may be displayed overlying one or more portions of the customized background image.

In some example embodiments, an appliance display, such as a display of a network connected appliance 102 and/or network connected appliance 202, may be configured to display each of a plurality of customized background images in a rotating succession. In this regard, an appliance in accordance with such example embodiments may be provided with a plurality of customized background images. The appliance may rotate display of the plurality of customized background images in a defined order, such as may be defined by a user of a user terminal (e.g., user terminal 108 and/or user terminal 208), and/or in a randomized order.

In some example embodiments, a background image that may be customized and displayed in an appliance display may be an animated background image, such as a short video clip or other image that may have a series of scenes.

Additionally or alternatively, in some example embodiments, the graphical user interface that may be displayed overlying a background image on an appliance display of a network connected appliance, such as network connected appliance 102 and/or network connected appliance 202, may be toggled on or off Thus, for example, when the graphical user interface is toggled off in such embodiments, the background image may be displayed without the graphical user interface overlying the background image to provide an unobstructed view of the background image on the appliance display.

It will be understood that each block of the flowcharts in FIGS. 5-6, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which may embody the procedures described herein may be stored by one or more memory devices of a computing device, such as a network connected appliance 102, customization service apparatus 106, user terminal 108, network connected appliance 202, and/or user terminal 208, and executed by a processor (e.g., processor 312 and/or processor 412) in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s). Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

Moreover, it will be appreciated that the ordering of blocks and corresponding method operations within the flowchart is provided by way of non-limiting example in order to describe operations that may be performed in accordance some example embodiments. In this regard, it will be appreciated that the ordering of blocks and corresponding method operations illustrated in the flowchart is non-limiting, such that the ordering of two or more block illustrated in and described with respect to the flowchart may be changed and/or method operations associated with two or more blocks may be at least partially performed in parallel in accordance with some example embodiments. Further, in some embodiments, one or more blocks and corresponding method operations illustrated in and described with respect to the flowchart may be optional, and may be omitted.

Functions in accordance with the above described embodiments may be carried out in many ways. In this regard, any suitable means for carrying out each of the functions described above may be employed to carry out various embodiments. In some embodiments, a suitably configured processor (e.g., processor 312 and/or processor 412) may provide all or a portion of the elements. In other embodiments, all or a portion of the elements may be configured by and operate under control of a computer program product. The computer program product for performing the methods of various embodiments of includes at least one computer readable storage medium having computer readable program code stored thereon. The computer readable medium (or media) may, for example, be embodied as and/or otherwise include the memory 314 and/or memory 414. However, it will be appreciated that a computer program product in accordance with various example embodiments may include any data storage device (e.g., a non-transitory computer readable storage medium) that can store data, which can be thereafter read by a computer system. Examples of the computer readable storage media include hard drives, network attached storage (NAS), read-only memory, random-access memory, one or more digital versatile disc (DVDs), one or more compact disc read only memories (CD-ROMs), one or more compact disc-recordable discs (CD-Rs), one or more compact disc-rewritable discs (CD-RWs), one or more Blu-Ray discs, magnetic tapes, flash memory, some combination thereof, and/or other optical and non-optical data storage devices. Some example embodiments may additionally or alternatively use computer readable storage media distributed over a network coupled computer system such that the computer readable code may be stored and executed in a distributed fashion.

It will be appreciated that the various aspects, embodiments, implementations and features of the described embodiments may be used separately or in any combination. Various aspects of the described embodiments may be implemented via computer program product, which may be provided via a computer-readable medium, such as memory 314 and/or memory 414, storing software and/or firmware, hardware, or a combination of hardware and software.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Therefore, the terminology used herein is for the purpose of describing particular embodiments only and is not intended to be limiting.

What is claimed is:

1. A method for customizing an appliance display, the method comprising:

receiving an indication of a selected image and an indication of a target appliance on which the selected image is to be displayed, wherein the target appliance is a network connected household appliance that is a cooking, cleaning or food preservation appliance;

determining one or more display characteristics of a display of the target appliance, including one or more of a size of the display, an orientation of the display, a resolution of the display, or color capabilities of the display, determining the one or more display characteristics including retrieving the one or more display characteristics from a database of display characteristics for a plurality of network connected household appliances including the target appliance, each of the plurality of network connected household appliances being a cooking, cleaning or food preservation appliance;

processing the selected image based at least in part on the one or more display characteristics to generate a customized image formatted for display as a background image on the display of the target appliance, processing the selected image including one or more of performing image scaling on the selected image, modifying a bit depth of the selected image, cropping the selected image, performing color swapping within a portion of the selected image, or applying dithering to a portion of the selected image; and configuring the target appliance, via a network, to display the customized image as a background image underlying a graphical user interface displayed on the display during operation of the target appliance, the graphical user interface displayed on the display during operation of the target appliance comprising operating status information for the target appliance, wherein at least one method operation is performed by a processor.

2. The method of claim 1, wherein:

receiving the indication of the selected image and the indication of the target appliance comprises receiving, at one or more servers via the network, an indication of the selected image and an indication of the target appliance sent to the one or more servers by a user terminal;

processing the selected image comprises the one or more servers processing the selected image; and configuring the target appliance comprises the one or more servers causing the customized image to be sent to the target appliance via the network.

3. The method of claim 2, further comprising:

the one or more servers providing a web-based interface accessible by the user terminal over the network, the web-based interface being configured to enable customization of an appliance display;

wherein receiving the indication of the selected image and the indication of the target appliance comprises receiving the indication of the selected image and the indication of the target appliance in response to user interaction with the web-based interface on the user terminal.

4. The method of claim 2, wherein:

receiving the indication of the selected image comprises receiving an image uploaded to the one or more servers by the user terminal.

5. The method of claim 1, wherein:

receiving the indication of the selected image and the indication of the target appliance comprises a user terminal receiving the indication of the selected image and the indication of the target appliance via an application implemented on the user terminal, the application being configured to enable customization of an appliance display;

processing the selected image comprises the user terminal processing the selected image; and configuring the target appliance comprises the user terminal sending the customized image to the target appliance via the network.

6. The method of claim 1, further comprising:

determining a user account;

determining one or more network connected household appliances associated with the user account; and causing the one or more network connected household appliances to be presented as selectable options;

wherein receiving the indication of the target appliance comprises receiving an indication of a selection of one of the one or more network connected household appliances.

7. The method of claim 1, wherein:

receiving the indication of the selected image comprises receiving an indication of a selection of an image from a plurality of available images presented for selection.

8. The method of claim 1, wherein determining one or more display characteristics of the display of the target appliance comprises determining one or more display characteristics further including one or more of an image file format supported by one or more of the display or the target appliance, or an image file size supported by one or more of the display or the target appliance.

9. The method of claim 1, wherein processing the selected image further comprises converting the selected image from a first file format to a second file format.

10. The method of claim 1, wherein processing the selected image comprises:

determining a region of interest within the selected image; and processing the selected image to generate a customized image formatted such that the region of interest is visible when displayed as a background image on the display of the target appliance.

11. The method of claim 1, wherein the network connected household appliance is one of a dishwasher, washing machine, clothes dryer, refrigerator, freezer, oven, range, cooktop, microwave oven, trash compactor, air conditioner, or water heater.

12. An apparatus comprising processing circuitry configured to cause the apparatus to at least:

receive an indication of a selected image and an indication of a target appliance on which the selected image is to be displayed, wherein the target appliance is a network connected household appliance that is a cooking, cleaning or food preservation appliance;

determine one or more display characteristics of a display of the target appliance, including one or more of a size of the display, an orientation of the display, a resolution of the display, or color capabilities of the display, the apparatus being caused to determine the one or more display characteristics including the apparatus being caused to retrieve the one or more display characteristics from a database of display characteristics for a plurality of network connected household appliances including the target appliance, each of the plurality of network connected household appliances being a cooking, cleaning or food preservation appliance;

process the selected image based at least in part on the one or more display characteristics to generate a customized image formatted for display as a background image on the display of the target appliance, the apparatus being caused to process the selected image including the apparatus being caused to one or more of perform image scaling on the selected image, modify a bit depth of the selected image, crop the selected image, perform color swapping within a portion of the selected image, or apply dithering to a portion of the selected image; and configure the target appliance, via a network, to display the customized image as a background image underlying a graphical user interface displayed on the display during operation of the target appliance, the graphical user interface displayed on the display during operation of the target appliance comprising operating status information for the target appliance.

13. The apparatus of claim 12, wherein the apparatus is implemented on one or more servers, and wherein the indication of the selected image and the indication of the target appliance are sent to the one or more servers by a user terminal.

14. The apparatus of claim 12, wherein the apparatus is implemented on a user terminal.

15. The apparatus of claim 12, wherein the processing circuitry is further configured to cause the apparatus to:
   determine a user account;
   determine one or more network connected household appliances associated with the user account;
   cause the one or more network connected household appliances to be presented as selectable options; and
   receive the indication of the target appliance comprises at least in part by causing the apparatus to receive an indication of a selection of one of the one or more network connected household appliances.

16. The apparatus of claim 12, wherein the processing circuitry is configured to cause the apparatus to process the selected image at least in part by causing the apparatus to:
   determine a region of interest within the selected image; and
   process the selected image to generate a customized image formatted such that the region of interest is visible when displayed as a background image on the display of the target appliance.

17. A system for customizing an appliance display, the system comprising:
   one or more servers;
   a network connected household appliance comprising a display configured to display a graphical user interface during operation of the network connected household appliance, the network connected household appliance being a cooking, cleaning or food preservation appliance, and the graphical user interface displayed on the display during operation of the network connected household appliance comprising operating status information for the network connected household appliance; and
   a user terminal configured to send an indication of a selected image to the one or more servers;
   wherein the one or more servers are configured to:
      receive the indication of the selected image;
      determine one or more display characteristics of the display, including one or more of a size of the display, an orientation of the display, a resolution of the display, or color capabilities of the display, the one or more servers being configured to determine the one or more display characteristics including the one or more servers being configured to retrieve the one or more display characteristics from a database of display characteristics for a plurality of network connected household appliances including the network connected household appliance, each of the plurality of network connected household appliances being a cooking, cleaning or food preservation appliance;
      process the selected image based at least in part on the one or more display characteristics to generate a customized image formatted for display as a background image on the display, the one or more servers being configured to process the selected image including the one or more servers being configured to one or more of perform image scaling on the selected image, modify a bit depth of the selected image, crop the selected image, perform color swapping within a portion of the selected image, or apply dithering to a portion of the selected image; and
      configure the network connected household appliance to display the customized image on the display as a background image underlying the graphical user interface.

* * * * *